Patented Aug. 22, 1944

2,356,449

UNITED STATES PATENT OFFICE 2,356,449

PURIFICATION OF PHTHALIC ANHYDRIDE

Karl H. Engel, West Englewood, and Henry L. Stasse, Hawthorne, N. J., assignors, by mesne assignments, to Allied Chemical & Dye Corporation, a corporation of New York No Drawing. Application October 13, 1941, Serial No. 414,778

7 Claims. (Cl. 260—342.5)

This invention relates to the purification of phthalic anhydride, particularly the crude product obtained by the vapor-phase catalytic oxidation of hydrocarbons such as naphthalene.

The crude phthalic anhydride as prepared by the catalytic-air oxidation of naphthalene contains maleic anhydride, benzoic acid and various impurities of known and unknown constitution. Many of the impurities cannot be separated from the pthalic anhydride by distillation. The freshly made phthalic anhydride in the molten state may be white or colorless, but the presence of certain impurities will cause it to change to mixed shades of yellow, brown, pink, reddish-brown, etc. on storage in the dark. When exposed to diffused light the change takes place more rapidly, and when exposed to ultra-violet light and direct sunlight, the discoloration takes place still more rapidly. The proportions of such impurities present in phthalic anhydride may be extremely small, but their presence in the final product is objectionable in view of the exacting commercial requirements concerning color and color-stability of phthalic anhydride, particularly that which is to be used for making resins. It is necessary to treat the crude phthalic anhydride so as to eliminate or minimize the effect of these color-forming impurities.

In the prior art, removal of color-forming impurities has been effected by various means, the more common of which comprise a fractional distillation preceded either by prolonged heating of the crude phthalic anhydride at temperatures above about 200° C. to convert the impurities to less volatile products or by treatment of the crude anhydride with various reagents such as oxygen, air, metallic oxides, mineral acids, etc., to destroy or convert the impurities to less volatile products.

The present invention has as an object the removal of the undesirable color-forming impurities from phthalic anhydride in a simple and efficient manner and the preparation of a phthalic anhydride which is substantially colorless, has excellent color stability on storage, and forms substantially colorless resins of the alkyd type such as condensation products of phthalic anhydride with polyhydric alcohols.

In accordance with the present invention, the crude phthalic anhydride containing color-forming impurities is treated with a small amount of stannous chloride followed by treatment with an alkali and distillation of the phthalic anhydride. As a result of the stannous chloride treatment, the color-forming impurities are converted into less volatile, highly-colored compounds which are readily separated by the distillation of the phthalic anhydride. The stannous chloride does not react with the phthalic anhydride itself except for relatively minute quantities which may be consumed in condensation with the color-forming impurities. Furthermore, the stannous chloride does not react with the tarry or high-boiling impurities always found in crude phthalic anhydride as is the case with many other purifying agents previously used by the prior art, particularly oxidizing agents. As a result of this, the stannous chloride may be used in relatively small amounts and may be applied directly to crude phthalic anhydride without preliminary distillation for the purpose of removing tarry impurities.

Another advantage of applicants' treatment is that it can be carried out in a comparatively short time. The stannous chloride reacts very quickly and completely with the color-forming impurities and in practice from ten minutes to about one-half hour, depending upon the temperature and amount of agitation, are required for complete contacting of the stannous chloride with the impurities. It has been found that a very satisfactory method of carrying out the treatment is by adding the stannous chloride in its hydrated form, $SnCl_2.2H_2O$, to molten phthalic anhydride at a temperature between 130° and 284° C., the melting point and boiling point, respectively, of the phthalic anhydride, and preferably at about 200° C. However, it is possible to treat the molten phthalic anhydride at temperatures above its boiling point, e. g., 300° C., by working under pressure. Subatmospheric pressures may also be used. The addition is preferably carried out with stirring or other mechanical agitation so as to obtain good contact of the phthalic anhydride and stannous chloride. Although anhydrous stannous chloride can be used, the hydrated form is preferred because at the temperature of molten phthalic anhydride the water of hydration boils away leaving the stannous chloride in extremely finely-divided form which promotes good contact with the phthalic anhydride.

The quantities of $SnCl_2.2H_2O$ preferably lie between about 1/20% and about 1%, and particularly between about 0.4% and 0.6%, based on the weight of the phthalic anhydride.

Stannic chloride, as well as other tin salts, are formed in the reaction. Since stannic chloride boils at 114° C., precautions should be taken that the toxic vapors of stannic chloride which may come off are trapped and not allowed to escape.

It would also be deleterious to the phthalic anhydride if the stannic chloride or other tin compounds were to distill off with it. Accordingly, it is necessary to render the tin compounds undistillable under the conditions of phthalic anhydride distillation by adding to the molten phthalic anhydride containing the reacted stannous chloride products a small quantity of finely-powdered alkali, particularly carbonates such as sodium carbonate, sodium bicarbonate, potassium carbonate, and potassium bicarbonate, as well as sodium and potassium hydroxide. A slight excess of alkali is used over that necessary for combination with the chloride ion present. Sodium bicarbonate is preferred for this purpose since it tends to disintegrate rapidly into very fine particles on addition to the molten anhydride and is therefore very readily dispersed and utilized. The alkali precipitates tin as oxides or hydroxides, alkali metal chloride being formed at the same time. The resulting precipitated products are undistillable under the conditions of phthalic anhydride distillation and remain behind when the phthalic anhydride is distilled off. About one-half hour is required for the alkali treatment.

The precipitated products are also insoluble in the molten anhydride and could, if desired, be largely eliminated by settling and decantation. However, since they are present in relatively small quantities, such separation is unnecessary and the whole reaction mixture may be subjected to distillation.

After the stannous chloride and alkali treatment, the phthalic anhydride is distilled or sublimed in any suitable equipment with due precautions to avoid spray contamination of the distillate. The mineral reagents and impurities which have been rendered undistillable under the conditions of phthalic anhydride distillation as well as tarry products originally present in the crude phthalic anhydride remain as still residues.

The resulting product is water-white when molten, color 0–10 (Hazen Standard), and is particularly resistant to discoloration by air-oxidation on storage or even on prolonged exposure to diffused or direct sunlight. When condensed with polyhydroxy alcohols, the phthalic anhydride purified by this method yields resins of the alkyd type having especially light colors.

Although it is not definitely known what causes the discoloration and lack of color stability of phthalic anhydride, it is believed that the major cause is the presence of minute quantities of quinones, particularly 1,4-naphthoquinone. It has been demonstrated that even less than one part per million of 1,4-naphthoquinone, although not noticeable in freshly distilled phthalic anhydride, will cause an appreciable discoloration to a yellowish or dirty-yellowish shade on storage. The change occurs slowly in the dark and rapidly in the light.

Although the mechanism by which applicants' treatment is effective in removing quinones and in increasing the color stability of phthalic anhydride is not definitely known, the stannous chloride apparently converts the quinones present to dyes of the phthalein type which are undistillable and resistant to decomposition by heat under the conditions of phthalic anhydride distillation.

The following examples illustrate applicants' invention:

*Example 1.*—A crude phthalic anhydride has a dark-brownish appearance and contains from 1 to 1.2% of tarry high-boiling material. Careful distillation of this crude, avoiding impure spray being carried over into the distillate, gives a product of white appearance as a solid, having a color in the molten state of 50–60 (Hazen Standard); its melting point is 130.5° C. It contains about 40 parts of 1,4-naphthoquinone per million and possibly other impurities. The distilled material lacks color stability and discolors slowly when stored in the dark, but rapidly in diffused light or in sunlight, changing from white to ivory, and finally to a dirty-yellowish color.

800 parts by weight of the above crude phthalic anhydride containing tarry impurities and naphthoquinone are heated to 200° to 205° C. in an iron kettle equipped with an agitator. 4 parts by weight of stannous chloride, $SnCl_2.2H_2O$, are added to the melt which is held at the above temperature range for 30 minutes. To the melt are then added 3.2 parts by weight of sodium bicarbonate to precipitate tin salts and the chloride radical, agitation of the mass being continued for another period of 30 minutes.

The greater part of the resulting granular precipitate settles rapidly to the bottom on standing, and can be removed by decantation, if desired. The treated crude is distilled at an absolute pressure of about 30 mm. of mercury, at a temperature of 180° C., care being taken to avoid contaminating spray being carried into the distillate. The yield of the distilled product is 775 parts by weight. Its melting point is 130.6° C. It is clear white as a solid, water-white when molten color 0–5 (Hazen Standard). The color does not change on storage in glass when exposed to diffused light for several months. Exposure of a ground sample to direct sunlight for 20 hours or to a strong ultra-violet light for 5 hours does not appreciably change the appearance of the solid product. In the molten state, a change in color from 0–5 to 10–15 (Hazen Standard) results on exposure of the purified phthalic anhydride to direct sunlight for 20 hours or to a strong ultra-violet light for 5 hours.

*Example 2.*—An exceptionally bad crude phthalic anhydride of blackish-brown appearance, having a color beyond the range of the Hazen Standard, when carefully distilled gives a product which immediately takes on a reddish-orange color, and on standing for about one week changes to a blackish-purple. Its melting point is 129.6° C. The freshly distilled material contains approximately 400 parts per million of 1,4-naphthoquinone besides other unidentified impurities.

The same crude without any previous treatment is melted and agitated for 30 minutes, at about 200° C., with 0.6% of its weight of stannous chloride, $SnCl_2.2H_2O$, and thereafter with 0.5% of its weight of sodium bicarbonate, also for 30 minutes. The treated material, carefully distilled, is clear white when solid. In molten state, it has a color of 0–5 (Hazen Standard). It does not discolor during storage in the laboratory for 90 days. Exposure to direct sunlight or to ultra-violet light does not cause noticeable discoloration of the solid product.

Although only stannous chloride has been shown as an example of applicants' invention, it will be understood that stannous bromide as well as other stannous halides may be used in place of stannous chloride.

The Hazen Standard color scale referred to herein is the one originally described in the "American Chemical Journal" volume 14, page 300 (1892) and later described at page 71 of "Physical and Chemical Examination of Paints, Varnishes, Lacquers and Colors" by Henry A. Gardner, 1939 ed., published by the Institute of Paint and Varnish Research, Washington, D. C.

We claim:

1. A process for producing substantially colorless, color-stable phthalic anhydride from crude phthalic anhydride containing tarry impurities and naphthoquinone which comprises agitating the crude phthalic anhydride in the molten state with a small amount of hydrated stannous chloride, adding at least sufficient sodium bicarbonate to react with all of the chloride ion present, and then distilling off the phthalic anhydride.

2. A process for producing substantially colorless, color-stable phthalic anhydride from phthalic anhydride containing naphthoquinone which comprises agitating the phthalic anhydride in the molten state at about 200° C. with not more than about 1% of hydrated stannous chloride based on the weight of phthalic anhydride, adding at least sufficient sodium bicarbonate to react with all of the chloride ion present, and distilling off the phthalic anhydride.

3. A process for producing substantially colorless, color-stable phthalic anhydride from phthalic anhydride containing naphthoquinone which comprises agitating the phthalic anhydride in the molten state at about 200° C. with from about 1/20% to about 1% of hydrated stannous chloride based on the weight of phthalic anhydride, adding at least sufficient sodium bicarbonate to react with all of the chloride ion present, and distilling off the phthalic anhydride.

4. A process for improving the color stability of impure phthalic anhydride containing color-forming impurities which comprises dispersing a small amount of stannous chloride in a molten mass of the impure phthalic anhydride, adding to the resulting mixture an alkali to react with the chloride ion present and then distilling off the phthalic anhydride.

5. A process for producing substantially colorless color-stable phthalic anhydride from crude phthalic anhydride containing tarry impurities and naphthoquinone, which comprises dispersing a small amount of stannous chloride into a molten mass of the crude phthalic anhydride, adding to the resultant mixture at least sufficient alkali to react with all of the chloride ion present and then distilling off the phthalic anhydride.

6. A process for producing substantially colorless color-stable phthalic anhydride from crude phthalic anhydride containing tarry impurities and naphthoquinone, which comprises dispersing a small amount of hydrated stannous bromide into a molten mass of the crude phthalic anhydride, adding to the resultant mixture at least sufficient alkali to react with all of the bromide ion present and then distilling off the phthalic anhydride.

7. A process for producing substantially colorless color-stable phthalic anhydride from crude phthalic anhydride containing tarry impurities and naphthoquinone, which comprises dispersing a small amount of hydrated stannous chloride into a molten mass of the crude phthalic anhydride, adding to the resultant mixture sodium bicarbonate to react with the chloride ion present and then distilling off the phthalic anhydride.

KARL H. ENGEL.
HENRY L. STASSE.